United States Patent
Chatterjee et al.

(10) Patent No.: US 8,134,382 B2
(45) Date of Patent: Mar. 13, 2012

(54) SEMICONDUCTOR WAFER HAVING SCRIBE LINE TEST MODULES INCLUDING MATCHING PORTIONS FROM SUBCIRCUITS ON ACTIVE DIE

(75) Inventors: Tathagata Chatterjee, Allen, TX (US); Joseph P. Ramon, Dallas, TX (US); Patricia Vincent, Prosper, TX (US)

(73) Assignee: Texas Instruments Incorporated, Dallas, TX (US)

( * ) Notice: Subject to any disclaimer, the term of this patent is extended or adjusted under 35 U.S.C. 154(b) by 217 days.

(21) Appl. No.: 12/760,650

(22) Filed: Apr. 15, 2010

(65) Prior Publication Data

US 2011/0253999 A1 Oct. 20, 2011

(51) Int. Cl.
*G01R 31/20* (2006.01)
(52) U.S. Cl. .................. 324/757.03; 324/757.04; 438/14
(58) Field of Classification Search ............. 324/757.03, 324/757.04; 438/14
See application file for complete search history.

(56) References Cited

U.S. PATENT DOCUMENTS

| | | | |
|---|---|---|---|
| 6,489,798 B1 * | 12/2002 | Scott-Thomas et al. | 324/762.01 |
| 7,915,056 B2 * | 3/2011 | Ellis-Monaghan et al. | 438/14 |
| 8,003,983 B2 * | 8/2011 | Yu | 257/48 |
| 2005/0156165 A1 * | 7/2005 | Eldridge et al. | 257/48 |
| 2009/0237103 A1 | 9/2009 | Ellis-Monaghan et al. | |

\* cited by examiner

*Primary Examiner* — Thomas Valone
(74) *Attorney, Agent, or Firm* — Jacqueline J. Garner; Wade J. Brady, III; Frederick J. Telecky, Jr.

(57) ABSTRACT

A semiconductor wafer includes a plurality of integrated circuit (IC) die areas for accommodating IC die that include at least a first subcircuit having at least one matched component portion that includes at least two matched devices. The first subcircuit is arranged in a layout on the IC die. A plurality of scribe line areas having a scribe line width dimension are interposed between the plurality of IC die areas. At least one subcircuit-based test module (TM) is positioned within the scribe line areas, wherein the subcircuit-based TMs implement a schematic for the first subcircuit with a TM layout that copies the layout on the IC die for at least the two matched devices in the matched component portion and alters the layout on the IC die for a portion of the first subcircuit other than the matched devices in matched component portion to fit the TM layout of the first subcircuit within the scribe line width dimension.

19 Claims, 6 Drawing Sheets

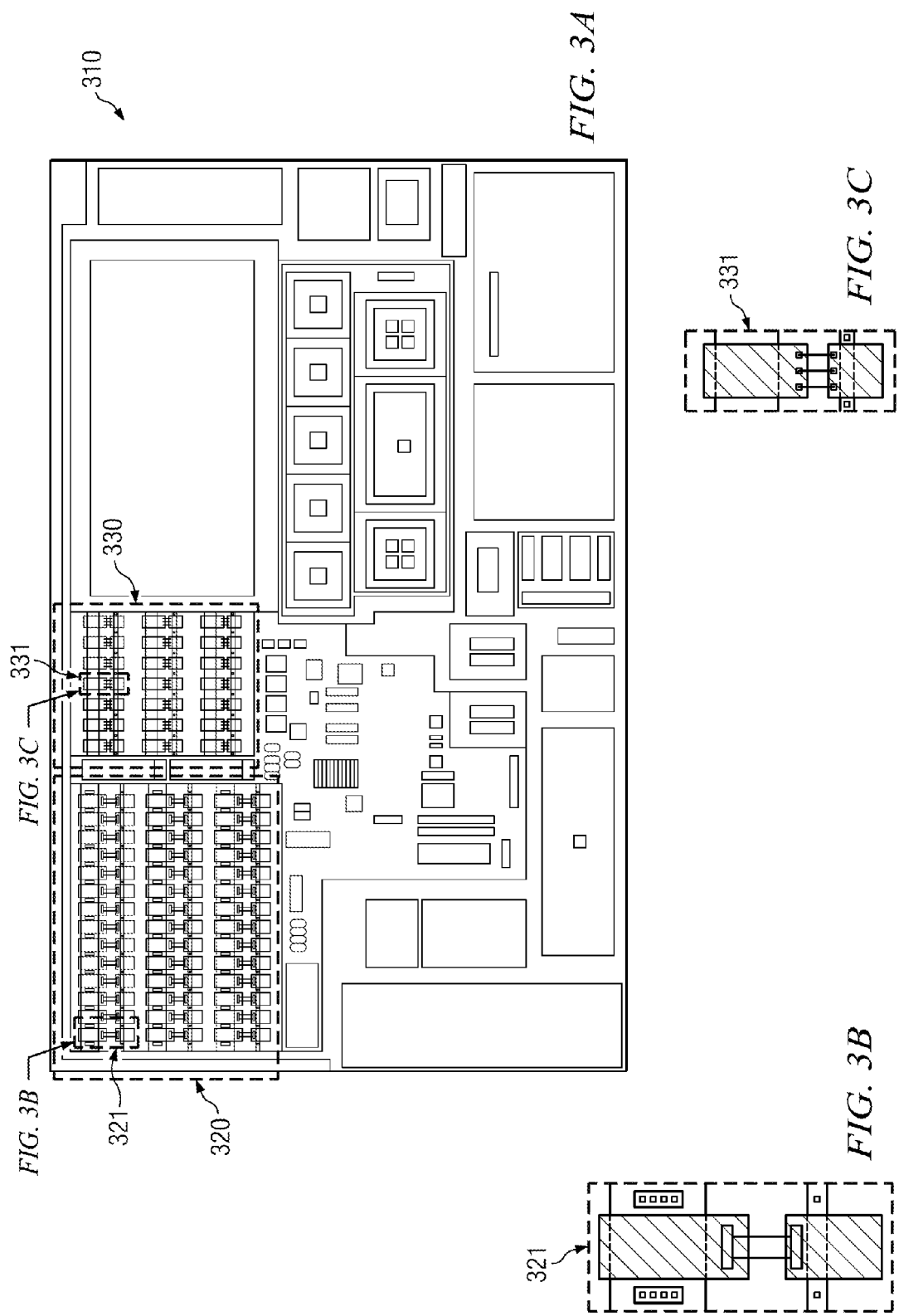

SEMICONDUCTOR WAFER HAVING SCRIBE LINE TEST MODULES INCLUDING MATCHING PORTIONS FROM SUBCIRCUITS ON ACTIVE DIE

FIELD

Embodiments disclosed herein relate to semiconductor wafers that include scribe line test modules comprising a plurality of test devices.

BACKGROUND

As known in the art, a plurality of integrated circuit (IC) die are formed on a semiconductor wafer by performing semiconductor processing including lithography, etch, ion implant and thin film processes. Following formation of the IC die, the wafer is sawed for singulation of the IC die. The vacant wafer spaces between the IC die used for sawing the wafer are referred to as scribe line areas.

To assess the electrical performance of the IC die, a predetermined pattern of measuring elements or test elements within a so-called test modules (TM) are generally formed in the scribe line areas of the wafer. The TMs generally include a plurality of discrete elements (e.g., MOS transistors, bipolar transistors, capacitors), sometimes interconnected as arrays of parallel elements, where the discrete elements correspond to discrete devices on the IC die. In order to secure yield at assembly test, the TM is electrically tested at wafer level, such as after an early metal level (e.g., first metal) and/or after completion of wafer processing, for determining whether the discrete circuit elements and components thereof are suitably formed (e.g., proper threshold voltage for MOS devices, Hfe for bipolar devices, I-V characteristics, and junction breakdown voltages) for the IC die. Conventional wafer level testing of TMs is performed by an automatic test system including a probe card and a test program that are both specific to the TM, along with a generic probe system and generic measurement/tester apparatus.

Wafer level testing on each active die generally requires significant engineering resources (e.g., 7 days minimum) and specific probe card hardware ranging in cost from about $2,000 to $10,000. To test the wafer, the specific wafer test cost can vary from $2 (sample probe) to >$200 per wafer. As a result of this cost, some IC products do not include any wafer level testing and thus rely solely on package level testing. Moreover, IC die for Wafer Scale Packaging (WSP) which involves a relayout process for the wafer at assembly, does not permit testing of the IC product before the last relayout is complete. Without wafer level testing or wafer level testing that can provide an accurate assessment of actual performance by the IC die, wafer fab induced yield problems may not be discovered for weeks or months after the wafer has completed its processing in the wafer fab. This long delay between wafer fab processing and testing can jeopardize deliveries to the customer and prevent prompt feedback to the wafer fab needed for timely process correction.

SUMMARY

The Inventors have recognized that conventional scribe line TMs do not generally provide either a complete nor an accurate assessment for certain circuit performance measures on the IC die, particularly for analog ICs and analog portions of mixed signal ICs. Regarding analog ICs and analog circuit portions, the accuracy of the assessment can depend on the matched component portion of subcircuits that comprise matched active devices (e.g. transistors or diodes) and/or matched passive devices (resistors or capacitors).

Analog and mixed signal IC die generally include at least one match-based subcircuit that comprise one or more matched component portions that comprises two or more matched devices. Matching between matched devices can be 1:1 or based on some desired ratio≠1, typically an integer>1, such as 8:1. As known in the art of IC circuit design, such match-based subcircuits that include matching portions are included in circuitry such as current mirrors and differential pairs that comprise two or more devices that are closely matched ("matched devices") using known design/layout matching aspects, including (1) use of the same structure, same layers and same doping, (2) same operating temperature (e.g. on same isotherm), (3) same shape and same size (for 1:1) or a size ratio≠1, (4) a minimum separation distance between the matched devices, (5) when applicable are arranged in certain geometries (e.g. defining a common centroid), (6) same orientation (e.g. so that the source to drain flows in matched transistors being strictly parallel), (7) same surroundings, and (8) use a non-minimum size. As a result, the Inventors have recognized that conventional TMs used across a plurality of different IC designs may lack important (e.g. performance impacting) subcircuit matching aspects that are generally specific to a given IC design.

Moreover, the Inventors have further recognized the need for the subcircuit matching layout features to closely copy the matching layout aspects in the matched devices in the matched component portion of the match-based subcircuit on the IC die to accurately assess the performance of the IC die. Without TMs having the same matching layout aspects used on the IC die, process-design-layout interactions that can have an adverse affect on the performance of the IC die generally remain undetected by conventional TMs until after package test. Delayed discovery of process-design-layout interactions that have an adverse affect on the performance of the IC die can cause significant delivery disruptions to customers as well as wafer scrap in the wafer fab that could have been minimized by timely identification of processing problems.

Disclosed embodiments described herein include semiconductor wafers comprising a plurality of IC die areas for accommodating IC die. As known in the art, the IC die comprises a plurality of subcircuits that are interconnected to implement a circuit function, where the positions and interconnections of the various devices on the IC die including its subcircuits are defined by the IC layout and its associated IC mask layout. The IC layout also defines the various component layers (e.g. metal, dielectric, semiconductor) including, sizes, geometric shapes, placement position including orientation for the various devices. The IC includes at least a first subcircuit that includes a matched component portion comprising at least two matched devices. In a typical embodiment, the IC includes a subcircuit having two or more matched component portions each having matched devices, wherein the subcircuit is statistically identifiable as being a process sensitive subcircuit using a design sensitivity analysis for the IC.

The semiconductor wafer includes a plurality of scribe line areas having a scribe line width dimension that are interposed between the plurality of IC die areas. At least one subcircuit-based TM is positioned within respective ones of the plurality of scribe line areas. The subcircuit-based TM includes the first subcircuit implemented with a layout that realizes the same schematic as on the IC die, while also copying the layout on the IC die for at least the matched devices in the matched component portion of the first subcircuit to include its various devices having the same structure/layers, the same shapes, the same sizes (i.e. same key dimensions), the same close separation distance between the matched devices, and in the case of a multiple intended identical devices in the matched component portion, arraying the devices such that the effects of spatial parametric gradients are minimized. Copying the above matching layout aspects present on the IC die for at least the matched devices in the matched component portion of the first subcircuit on the TM is to achieve the essentially same ratio of electrical parameters between the two or more devices involved in the matching on the IC die.

Therefore, subcircuit-based TMs disclosed herein by virtue of having matching layout features that copy the matching layout aspects of the matched devices in the matched component portion(s) on the IC die can thus more accurately assess the performance of the IC die as compared to conventional TMs. Such subcircuit-based TMs can therefore be effective in identifying process-design-layout interactions specific to particular IC designs. Moreover, subcircuit-based TMs disclosed herein do not require specific probe card hardware for each IC design because the TMs can be a constant rectangular shape regardless of the particular IC. Disclosed embodiments thus solve the problem of cost for wafer level testing of IC devices, and the capability to test wafers before relayout, such as wafers for WSP applications.

BRIEF DESCRIPTION OF THE DRAWINGS

FIG. 3A is a depiction of a bandgap reference (BGR) subcircuit extracted (i.e., unchanged) from a device layout for production DC-DC converter die, wherein the BGR includes a proportional to absolute temperature (PTAT) current source including matching circuitry, and a temperature independent current source including matching circuitry.

FIG. 3B depicts the layout of one of the matching MOS transistor pairs in the PTAT current source shown in FIG. 3A.

FIG. 3C depicts the layout of one of the matching MOS transistor pairs in the temperature independent current source shown in FIG. 3A.

DETAILED DESCRIPTION

Figure 1:
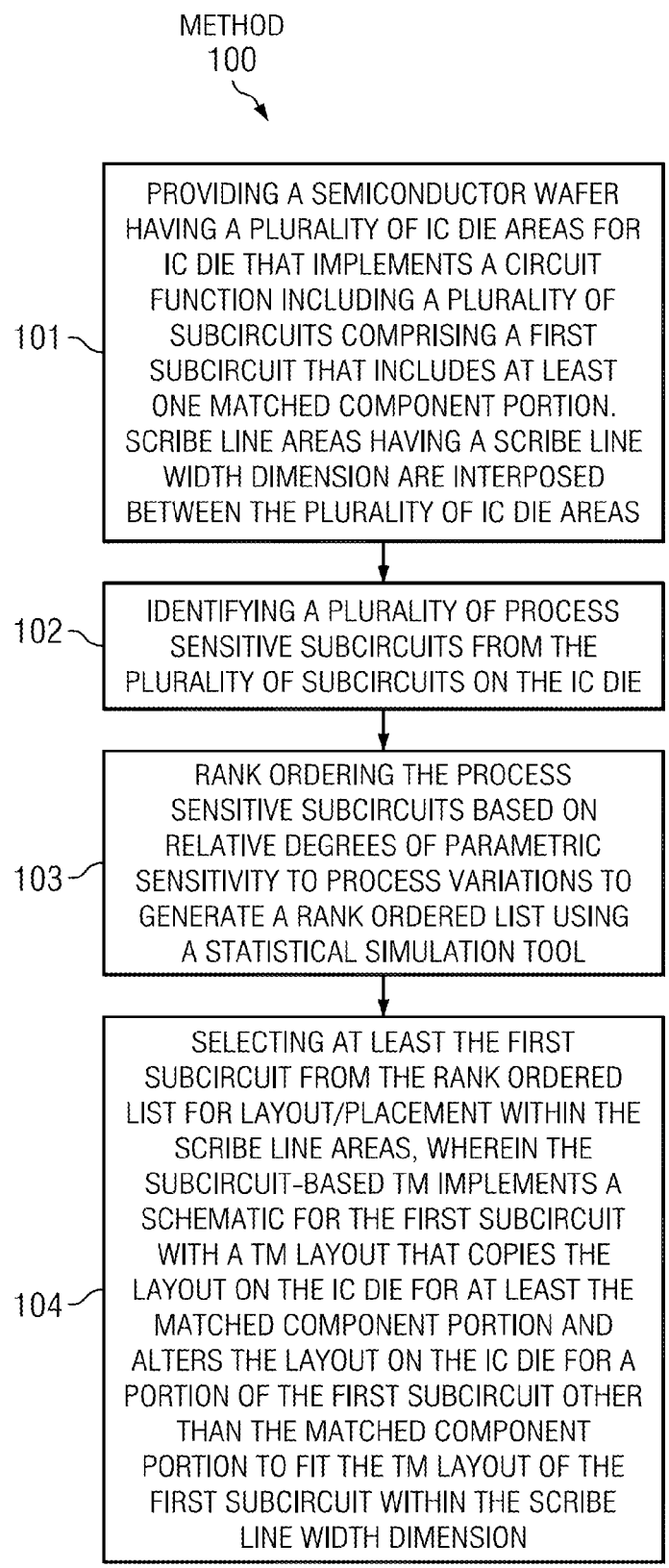
FIG. 1 is a flow chart that shows steps in an exemplary method of designing subcircuit-based scribe line TMs that can be used for assessing process parameter matching on active IC die formed on a semiconductor wafer, according to a disclosed embodiment.

Embodiments of the invention are described with reference to the attached figures, wherein like reference numerals are used throughout the figures to designate similar or equivalent elements. The figures are not drawn to scale and they are provided merely to illustrate the instant invention. Several aspects are described below with reference to example applications for illustration. It should be understood that numerous specific details, relationships, and methods are set forth to provide a full understanding of embodiments of the invention. One having ordinary skill in the relevant art, however, will readily recognize that embodiments of the invention can be practiced without one or more of the specific details or with other methods. In other instances, well-known structures or operations are not shown in detail to avoid obscuring aspects disclosed herein. Embodiments of the invention are not limited by the illustrated ordering of acts or events, as some acts may occur in different orders and/or concurrently with other acts or events. Furthermore, not all illustrated acts or events are required to implement a methodology in accordance with embodiments of the invention.

Referring to FIG. 1, a first disclosed embodiment comprises an exemplary method 100 of designing a subcircuit-based scribe line TM that can be used for assessing process controlled match-based parameters for IC die formed on a semiconductor wafer. Information obtainable from testing TMs disclosed herein include information that cannot otherwise be obtained can be helpful to the wafer fab to permit timely detection of processing problems, such as in one embodiment when the wafer goes to wafer scale packaging, so that the bond pads on the IC die cannot be touched before the last relayout process step, which is usually performed after the wafer leaves the wafer fab.

Step 101 comprises providing a semiconductor wafer having a plurality of IC die areas for accommodating IC die comprising a plurality of subcircuits arranged in a layout that are interconnected to implement a circuit function. The IC die is generally an analog or mixed signal die, but can also be a digital die. At least a first of the plurality of subcircuits on the IC die includes at least one matched component portion that comprises at least two matched devices, such as differential pair. The semiconductor wafer also includes a plurality of scribe line areas having a scribe line width dimension that are interposed between the plurality of IC die areas.

Step 102 comprises identifying a plurality of process sensitive subcircuits from the plurality of subcircuits on the IC die. The performance of such subcircuits (e.g., precision of a voltage reference or offset of a differential pair) can have a significant sensitivity to one or more processing parameters, including the device matching (e.g. MOS threshold voltage or bipolar Hfe matching) provided by the process. The identifying can comprise a design sensitivity analysis. Design sensitivity analysis involves quantifying the effect of deviation of a component's electrical parameter on key circuit performance parameters. For critically matched components, the deviation of the true ratio of the critical component parameter from its ideal ratio leads to deviation in the key circuit performance parameters. In most circuits whose parametric performance relies on good matching of critically matched pairs, the ratio of the key electrical parameters of the matched components have a much larger impact on circuit performance than does the absolute value of the same component electrical parameter. The plurality of process sensitive subcircuits identified in step 102 include at least the first subcircuit.

Step 103 comprises rank ordering the process sensitive subcircuits based on relative degrees of parametric sensitivity to process variations to generate a rank ordered list using a statistical simulation tool. Simulation tools are used to detect design sensitivity based on process parameters variation. The relative degrees are generally provided as quantitative measures. In one embodiment the statistical simulation tool comprises Analog Circuit Studio (ACS) Statistical Design. As known in the art, ACS is a block-level analog circuit design, characterization, and statistical analysis package. ACS allows designers and other interest parties to capture test circuits, extract performances (e.g. phase margin) from simulation data, and explores circuit behavior over process and mismatch variation. Alternatives to ACS include, but are not limited to, statistical SPICE (i.e. Monte Carlo simulation of circuit performance using random mismatch models for critically matched pairs).

Step 104 comprises selecting at least the first subcircuit from the rank ordered list for layout within the scribe line areas. The first subcircuit is generally the highest ranked on the ordered list that has a dimension that can be fit within the scribe line areas while providing a layout for at least the matched devices in the matched component portion that copies the matched device layout on the IC die. As described above, the copying the layout on the IC die for at least the matched devices of the first subcircuit to include its various devices having the same structure/layers, the same shapes, the same sizes (i.e. same key dimensions), the same close separation distance between the matched devices, and in the case of a multiple intended identical devices in the matched component portion, arraying the devices such that the effects of spatial parametric gradients are minimized.

In a typical embodiment, the first subcircuit may have a width dimension that exceeds the scribe line width dimension, and a layout of a portion of the first subcircuit other than the matched devices in the matched component portion is stretched in a direction perpendicular to the scribe line width dimension to allow the first subcircuit to fit within the scribe line area. For example, non-matched devices, such as isolated capacitors can be stretched in the height direction to fit within the width of the scribe line, which can be 50 μm, or less. Other non-matched circuitry examples include in a frequency compensation circuit employing an RC feedback path, where the absolute value of the resistor and capacitor are critical (i.e. they need to be within a certain range for the circuit to be stable). Another example is an oscillator whose oscillation frequency is set by a charging current and the absolute value of a capacitor.

Figure 2A:
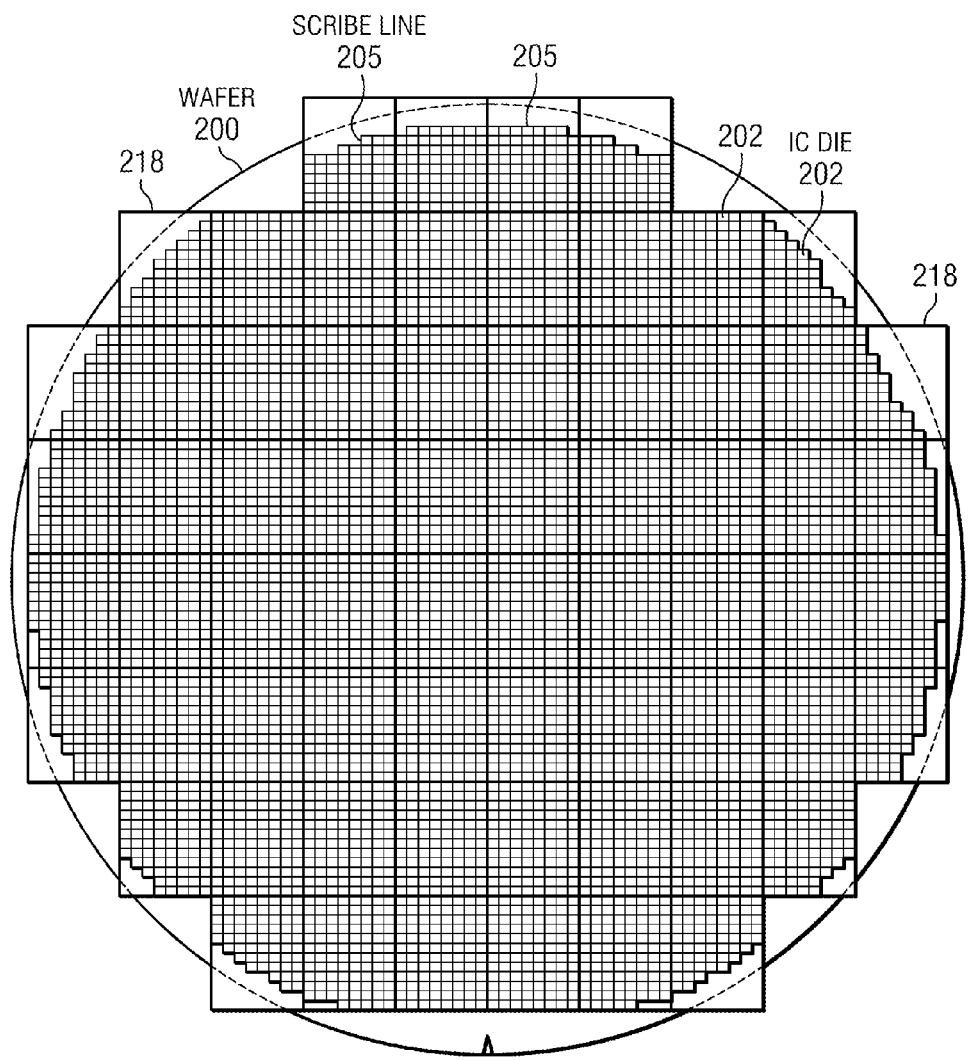
FIG. 2A is a depiction of a semiconductor wafer including a plurality of shotmap arrays representing groups of IC die associated with individual stepper printing shots that are separated by scribe line areas, according to a disclosed embodiment.

FIG. 2A is a depiction of a semiconductor wafer 200 including a plurality of shotmap arrays 218 representing groups of IC die 202 associated with individual stepper printing shots that are separated by scribe line areas 205, according to a disclosed embodiment. As described below relative to FIG. 2B subcircuit-based TMs 208 according to a disclosed embodiment are positioned in some of the scribe line areas 205. The shotmap array 218 is shown repeated a plurality of times over the area of the semiconductor wafer 200.

Figure 2B:
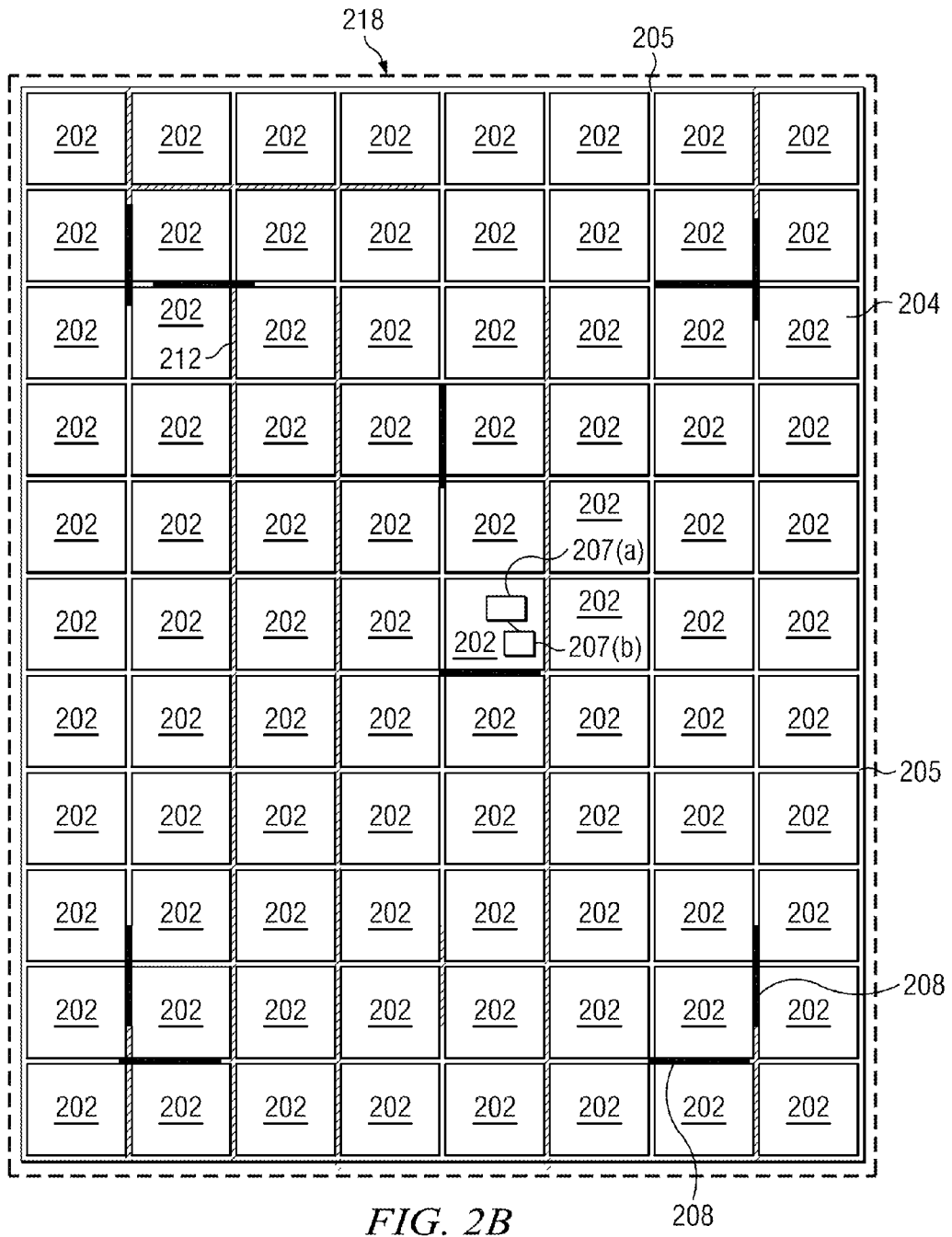
FIG. 2B is a depiction of an exemplary shotmap array that comprises a plurality of subcircuit-based TMs according to a disclosed embodiment.

FIG. 2B is a depiction of an exemplary shotmap array 218 that comprises a plurality of subcircuit-based TMs 208 in some of the scribe line areas 205 according to a disclosed embodiment. IC die 202 are formed on die areas 204 and comprise a plurality of subcircuits, shown as subcircuits 207(a) and 207(b) depicted in FIG. 2B. The subcircuit-based TM modules 208 in the shotmap array 218 are shown as two subcircuit-based TMs 208 near each corner and two TMs 208 near a center of a m×n grouping of IC die 210, where m and n are both ≧2. As shown in FIG. 2B the exemplary shotmap array 218 is 8×11 for IC die 202. The shotmap array 218 shown corresponds to a photomask or reticle used for photo shots using a stepper-based lithography system, and thus shotmap array 218 can independently reveal printing problems for IC die 202 positioned proximate to any of the corners or near the center for each shotmap array 218.

The subcircuit-based TMs 208 are depicted as having a length that is at least a factor of ten (10) larger as compared to its width. As described above, the width of subcircuit-based TM 208 is constrained to fit within the width of the scribe line areas 205, which can have a width of about 50 μm, or even less. The length of the scribe line areas is generally based on the size of the IC die, and is generally at least 500 μm, such as 1 mm or more.

As known in the art, the active circuitry on the IC die comprises circuit elements that generally include transistors, diodes, capacitors, and resistors, as well as signal lines and other conductors that interconnect these various circuit elements. Semiconductor wafer 200 also generally includes a plurality of standard parametric TMs 212 that as described above comprises plurality of discrete elements, sometimes interconnected as arrays of parallel elements, where the discrete elements correspond to discrete devices on the IC die. The standard parametric TMs 212 are shown occupying a substantially smaller area as compared to subcircuit-based TMs 208 according to an embodiment of the invention. However, this need not be the case.

Although not shown in FIG. 2B, the subcircuit-based TMs 208 (as well as standard parametric TMs 212) may include locally shared pins for at least two, up to a maximum number set by the total number of terminals, for the devices to be tested in the TM. For example, for three terminal devices, such as bipolar transistors, locally shared pins can be coupled to at least two of the Base, Emitter and Collector terminals. In the case of MOS transistors in the TM, which are generally tested as four terminal (Gate, Source, Drain, Body) or five terminal devices (Gate, Source, Drain, Body, and Substrate), locally shared pins can be coupled to at least two of the five (5) (Gate, Source, Drain, Body, and Substrate) terminals.

FIGS. 3A-F described below include exemplary layout details that are based on an actual production DC-DC converter die comprising a plurality of interconnected subcircuits including a BGR subcircuit that comprises at least one match-based circuit portion that has one or more instances of matched devices. The subcircuits for the DC-DC converter die comprise the BGR subcircuit for generating a reference voltage (Vref), an error amplifier, a pulse width modulator, an output driver, and an output stage. The data size for the production DC-DC converter die was about 2307 μm×2094 μm, and the data size of the BGR subcircuit was about 297 μm×181 μm.

The BGR subcircuit comprises a first match-based circuit portion comprising a PTAT current source including matching circuitry that generates a reference current that reduces in magnitude with increasing temperature (and can be used by the BGR subcircuit to cancel the temperature dependency of its diode), and a second match-based circuit portion comprising temperature independent current source including matching circuitry. As described above, since the width of the scribe line areas may be 52 μm, or less, the layout of the BGR on the DC-DC converter die cannot be fit into the scribe line areas for TMs absent significant layout changes.

FIG. 3A is a depiction of a BGR subcircuit 310 extracted (i.e. unchanged) from the device layout for production DC-DC converter die described above, according to a disclosed embodiment. The data size is about 297 μm×181 μm. The BGR subcircuit 310 is shown comprising a first match-based circuit portion comprising a PTAT current source 320 including matching circuitry comprising a plurality of matched MOS transistor pairs 321, and a second match-based circuit portion comprising temperature independent current source 330 including matching circuitry comprising a plurality of matched MOS transistor pairs 331.

FIG. 3B depicts the layout of one of the matching MOS transistor pairs 321 in the PTAT current source 320 shown in FIG. 3A. FIG. 3C depicts the layout of one of the matched MOS transistor pairs 331 in the temperature independent current source 330 shown in FIG. 3A.

Figure 3D:
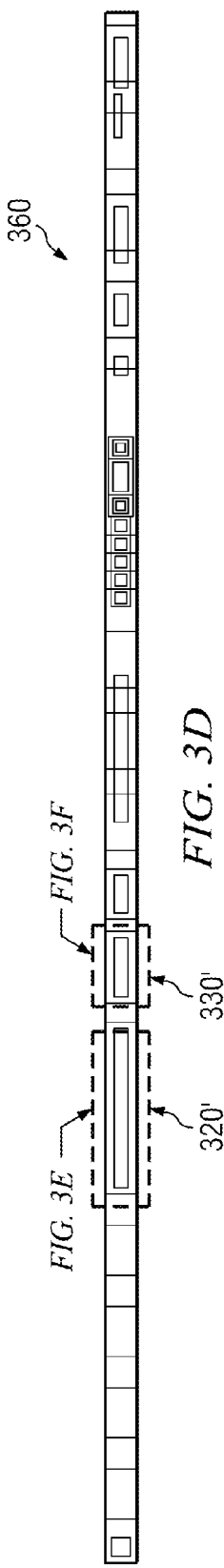
FIG. 3D is a depiction of a layout of a scribe line subcircuit-based TM that implements the schematic of the BGR layout shown in FIG. 3A, but is stretched in part to fit into a 52 μm wide scribe line, wherein the matching layout aspects present on the IC die are used in the layout of the matched devices in their matching portions on the subcircuit-based TM, according to a disclosed embodiment.

FIG. 3D is a depiction of a layout of a scribe line subcircuit-based TM 360 that implements the schematic of the BGR layout shown in FIG. 3A, but is stretched in part to fit into a 52 μm wide scribe line, according to a disclosed embodiment. The matching layout aspects for the matched devices present on the IC die are used in the layout of the matching portions on the subcircuit-based TM 360. Resistors whose length exceeded 52 um, capacitors whose length exceeded 52 um, and all metal routing was redesigned to connect the respective components to achieve the BGR schematic within the stretched layout. The data size for the TM layout for the scribe line subcircuit-based TM 360 was 1551 μm×50 μm (including the bond pads, conductor lines to allow testing and the stretched BGR, and the stretched BGR).

Figure 3F:
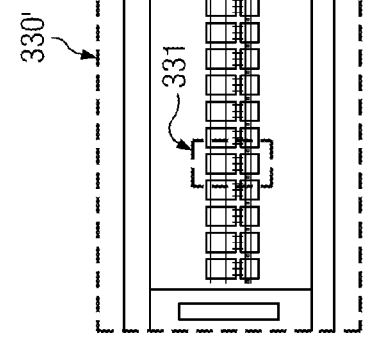
FIG. 3F is an expanded view of the MOS transistor pairs in the temperature independent current source in FIG. 3D evidencing all of its matching MOS transistor pairs are copied exactly from the BGR subcircuit layout shown in FIG. 3A.
Figure 3E:
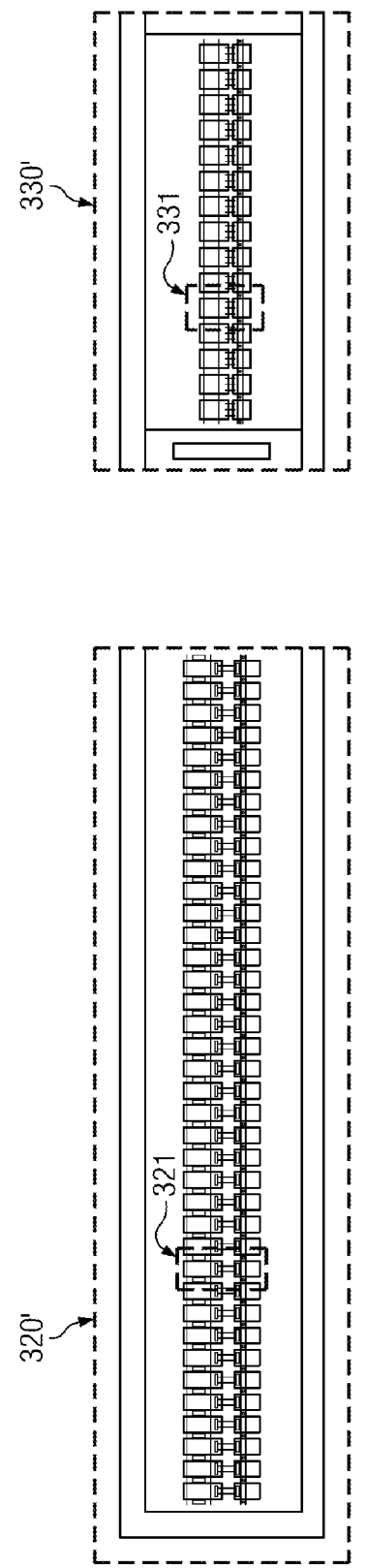
FIG. 3E is an expanded view of the MOS transistor pairs in the PTAT current source shown in FIG. 3D evidencing all of its matching MOS transistor pairs are copied exactly from the BGR subcircuit layout shown in FIG. 3A.

FIG. 3E is an expanded view of the PTAT current source 320' shown in FIG. 3D evidencing all of its matched MOS transistor pairs 321 are copied exactly from the BGR subcircuit layout shown in FIG. 3A. The respective stacked rows for PTAT current source 320 shown in FIG. 3A are now positioned in a linear arrangement in the PTAT current source 320' as shown in FIG. 3E.

FIG. 3F is an expanded view of the MOS transistor pairs 331 in the temperature independent current source 330' in FIG. 3D evidencing all of its matched MOS transistor pairs 331 are copied exactly from the BGR subcircuit layout shown in FIG. 3A. The respective stacked rows for temperature independent current source 330 shown in FIG. 3A are now positioned in a linear arrangement in the temperature independent current source 330' as shown in FIG. 3F.

Scribe line subcircuit-based TM 360 is thus an example of an implementation where the layout of at least one of the rank-ordered subcircuits for performance of an IC die (BGR 310) is modified to physically fit within the scribe line while preserving the layout of the matched devices that as described above are generally result in the most performance sensitivity to the associated active IC.

Figure 4A:
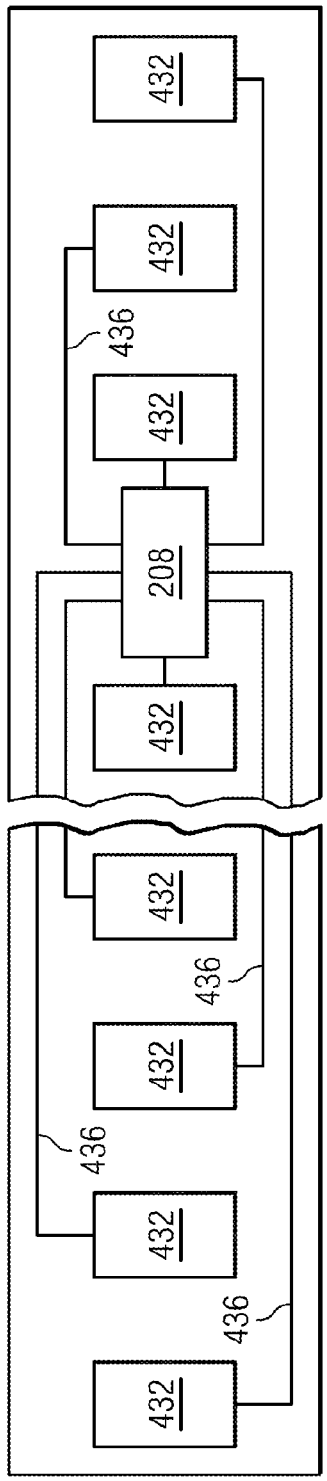
FIGS. 4A and 4B show a standard parametric TM and a subcircuit-based TM according to a disclosed embodiment, respectively, both having the same standard probe pad configuration, according to a disclosed embodiment.
Figure 4B:
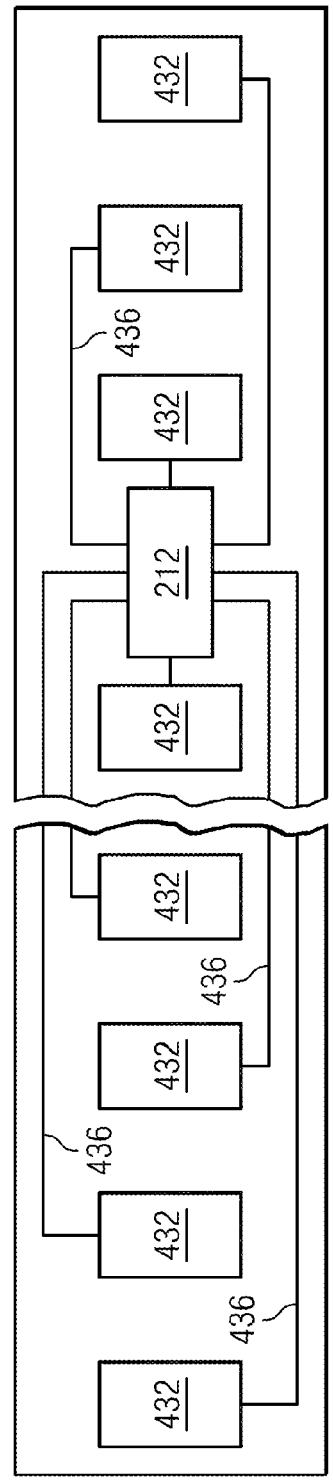

FIGS. 4A and 4B show a standard parametric TM and a subcircuit-based TM according to a disclosed embodiment, respectively, both having the same standard probe pad configuration, according to a disclosed embodiment. A standard bond pad configuration for subcircuit-based TMs disclosed herein allows the use of a standard probe card. In the past IC designers put TMs in the scribe line areas, but with the TMs for different ICs having different bond pad configurations, resulting in most conventional scribe line TMs not being used for production, and typically only used to perform some manual characterization. As described above, one production use for subcircuit-based TMs disclosed herein is in production for WSP devices, which are becoming a preferred packaging for a variety of devices.

Probe pads are indicated as reference 432. In one particular embodiment the number of probes pads on each TM total 16.

Electrical conductor lines 436 are shown connecting the probe pads 432 and to TM 208 in FIG. 4A and to TM 212 in FIG. 4B such that the TMs are testable through the probe pads 432. The conductor lines 436 typically comprise metal lines, e.g., Cu lines and/or Al lines, but may also be provided by any electrically conductive material formed in front-end-of-the-line (FEOL) processing. The probe pads 432 generally include input pads, output pads, at least one power supply pad, and at least one ground pad. The pads 432 may also be referred to as test pads since a tester probe may contact the probe pads 432. The input pads can provide digital and analog input signals employed to test the respective TMS.

Another disclosed embodiment comprises a method of a testing semiconductor wafer having a plurality of IC die areas for accommodating IC die that implements a circuit function. The IC die comprises a plurality of subcircuits including at least a first subcircuit that includes at least one matched component portion that comprises one or more instances of matched devices. The wafer includes a plurality of scribe line areas having a scribe line width dimension interposed between the plurality of IC die areas, and a subcircuit-based scribe line TM within a portion of the scribe line areas.

The subcircuit-based TM implements a schematic for the first subcircuit with a TM layout that copies the layout on the IC die for at least the matched devices in the matched component portion and alters the layout on the IC die for a portion of the first subcircuit other than the matched devices to fit the TM layout of the first subcircuit within the scribe line width dimension. The subcircuit-based TMs is probed to obtain test data. The plurality of IC die on the wafer are dispositioned based at least in part on the test data from the subcircuit-based TMs.

In a typical embodiment, a plurality of the subcircuit-based TM are positioned in the scribe line areas within an IC die/TM pattern including the subcircuit-based TM near each corner and near a center of a m×n grouping of the IC die (see FIG. 2B described above), where m and n are ≧2, and wherein the IC-die/TM pattern is repeated a plurality of times over an area of the semiconductor wafer. In this embodiment the dispositioning comprises evaluating test data along from the TM together with a location for its corresponding IC die/TM pattern, and rejecting at least one of the IC die on the wafer based exclusively on the test data and the location of the IC die/TM pattern.

In other disclosed embodiments, dispositioning can be based on combining data obtained from the subcircuit-based TMs together with data from standard parametric TMs. In this embodiment, the standard TMs provides absolute values for discrete parameters, which can be used by the wafer fab to center processes, while subcircuit-based TMs can provides delta values (match-based parameters), which provides measures of local process variability and can be used to control local variability of the process. The respective data collections can take place at a different points in the fabrication process.

While various embodiments of the invention have been described above, it should be understood that they have been presented by way of example only, and not limitation. Numerous changes to the disclosed embodiments can be made in accordance with the disclosure herein without departing from the spirit or scope of the disclosed embodiments. Thus, the breadth and scope of embodiments of the invention should not be limited by any of the above described embodiments.

Rather, the scope of embodiments of the invention should be defined in accordance with the following claims and their equivalents.

Although embodiments of the invention have been illustrated and described with respect to one or more implementations, equivalent alterations and modifications will occur to others skilled in the art upon the reading and understanding of this specification and the annexed drawings. In addition, while a particular feature disclose herein may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention claimed is:

1. A semiconductor wafer, comprising:
   a plurality of integrated circuit (IC) die areas for accommodating IC die that implement a circuit function comprising at least a first subcircuit that includes at least one matched component portion comprising at least two matched devices, wherein said first subcircuit is arranged in a layout on said IC die;
   a plurality of scribe line areas having a scribe line width dimension interposed between said plurality of IC die areas, and
   at least one subcircuit-based test module (TM) positioned within respective ones of said plurality of scribe line areas, said subcircuit-based TM implementing a schematic for said first subcircuit with a TM layout that copies said layout on said IC die for at least said two matched devices in said matched component portion and alters said layout on said IC die for a portion of said first subcircuit other than said two matched devices to fit said TM layout of said first subcircuit within said scribe line width dimension.

2. The semiconductor wafer of claim 1, wherein said IC die comprises an analog die or a mixed signal die.

3. The semiconductor wafer of claim 1, wherein said subcircuit-based TM comprises two or more different ones of said matched component portions.

4. The semiconductor wafer of claim 1, further comprising a plurality of standard parametric TMs, wherein some of said plurality of said scribe line areas include said standard parametric TMs and some of said plurality of said scribe line areas include said subcircuit-based TM.

5. The semiconductor wafer of claim 4, wherein said plurality of standard parametric TMs have a probe pad configuration and said subcircuit-based TM module has said probe pad configuration.

6. The semiconductor wafer of claim 1, wherein a plurality said subcircuit-based TM modules are positioned in said scribe line areas that are within an IC die/TM pattern including said subcircuit-based TM near each corner and near a center of a m×n grouping of said IC die, where said m and said n are $\geq 2$, and wherein said IC die/TM pattern is repeated a plurality of times over an area of said semiconductor wafer.

7. A method of designing a subcircuit-based scribe line test module (TM) for a semiconductor wafer having a plurality of integrated circuit (IC) die areas for accommodating IC die that implement a circuit function comprising at least a first subcircuit that includes at least one matched component portion comprising at least two matched devices, wherein said first subcircuit is arranged in a layout on said IC die and said semiconductor wafer includes a plurality of scribe line areas having a scribe line width dimension interposed between said plurality of IC die areas, comprising:
   identifying a plurality of process sensitive subcircuits from said plurality of subcircuits, wherein said plurality of process sensitive subcircuits include said first subcircuit, each of said plurality of process sensitive subcircuits have a layout;
   rank ordering said process sensitive subcircuits based on relative degrees of parametric sensitivity to process variations to generate a rank ordered list using a statistical simulation tool;
   selecting at least said first subcircuit from said rank ordered list for placement within said scribe line areas, and
   generating a TM layout for said first subcircuit to provide a subcircuit-based TM, wherein said TM layout of said first subcircuit implements a schematic for said first subcircuit on said IC die, copies said layout on said IC die for at least said two matched devices in said matched component portion and alters said layout on said IC die for a portion of said first subcircuit other than said two matched devices in said matched component portion to fit said TM layout of said first subcircuit within said scribe line width dimension.

8. The method of claim 7, wherein said statistical simulation tool comprises analog circuit studio (ACS) or statistical SPICE.

9. The method of claim 7, wherein said identifying comprises a design sensitivity analysis.

10. The method of claim 7, wherein said IC die comprises an analog die or a mixed signal die.

11. The method of claim 7, wherein said subcircuit-based TM comprises two or more of said different ones of said matched component portions.

12. The method of claim 7, further comprising a plurality of standard parametric TMs, wherein some of said plurality of said scribe line areas include said standard parametric TMs and some of said plurality of said scribe line areas include said subcircuit-based TM.

13. The method of claim 12, wherein said plurality of standard parametric TMs have a probe pad configuration and said subcircuit-based TM has said probe pad configuration.

14. The method of claim 7, wherein a plurality of said subcircuit-based TM modules are positioned in said scribe line areas within an IC die/TM pattern including said subcircuit-based TM near each corner and near a center of a m×n grouping of said IC die, where said m and said n are $\geq 2$, and wherein said IC-die/TM pattern is repeated a plurality of times over an area of said semiconductor wafer.

15. A method of a testing semiconductor wafer having a plurality of integrated circuit (IC) die areas for accommodating IC die that implement a circuit function comprising at least a first subcircuit that includes at least one matched component portion comprising at least two matched devices, wherein said first subcircuit is arranged in a layout on said IC die, said semiconductor wafer including a plurality of scribe line areas having a scribe line width dimension interposed between said plurality of IC die areas, and a subcircuit-based scribe line test module (TM) within a portion of said scribe line areas, wherein said subcircuit-based TM implements a schematic for said first subcircuit with a TM layout that copies said layout on said IC die for at least said two matched devices in said matched component portion and alters said layout on said IC die for a portion of said first subcircuit other than said matched component portion to fit said TM layout of said first subcircuit within said scribe line width dimension;

probing said subcircuit-based TMs to obtain test data, and dispositioning said plurality of IC die on said semiconductor wafer based at least in part on said test data obtained from said subcircuit-based TMs.

16. The method of claim 15, wherein a plurality of said subcircuit-based TM are positioned in said scribe line areas within an IC die/TM pattern including said subcircuit-based TM near each corner and near a center of a m×n grouping of said IC die, where said m and n are ≧2, and wherein said IC-die/TM pattern is repeated a plurality of times over an area of said semiconductor wafer, wherein said dispositioning comprises:

evaluating said test data along together with a location for its corresponding IC die/TM pattern, and rejecting at least one of said IC die on said wafer based exclusively on said test data and said location of said IC die/TM pattern.

17. The method of claim 15, wherein said IC die comprises an analog die or a mixed signal die.

18. The method of claim 15, wherein said subcircuit-based TM comprises two or more of said different ones of said matched component portions.

19. The method of claim 15, wherein said semiconductor wafer further comprises a plurality of standard parametric TMs, wherein some of said plurality of said scribe line areas include said standard parametric TMs and some of said plurality of said scribe line areas include said subcircuit-based TM, further comprising:

probing said standard parametric TMs to obtain standard parametric test data, and dispositioning said plurality of IC die on said semiconductor wafer based on said test data obtained from said subcircuit-based TMs and said standard parametric test data from said standard parametric TMs.

\* \* \* \* \*